(12) United States Patent
Yamashita et al.

(10) Patent No.: US 6,348,915 B1
(45) Date of Patent: Feb. 19, 2002

(54) DATA-TRANSFERRING METHOD AND APPARATUS FOR REDUCING THE NUMBER OF DATA-BIT CHANGES

(75) Inventors: Hiroshi Yamashita, Fujisawa; Masashi Nakano, Sagamihara, both of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/426,472

(22) Filed: Oct. 26, 1999

(30) Foreign Application Priority Data

Nov. 5, 1998 (JP) ............................................. 10-314681

(51) Int. Cl.$^7$ .............................. G09G 5/00; G09G 3/36
(52) U.S. Cl. ........................... 345/204; 345/87; 345/96; 345/98
(58) Field of Search ............................... 345/87–89, 96, 345/98, 100, 204

(56) References Cited

U.S. PATENT DOCUMENTS 5,734,378 A * 3/1998 Okada et al. ............... 345/204
5,986,648 A * 11/1999 Okada et al. ............... 345/100
6,229,513 B1 * 5/2000 Nakano et al. ............... 345/96
6,236,393 B1 * 5/2001 Ogawa et al. .............. 345/204

FOREIGN PATENT DOCUMENTS

JP          8-79312          7/1998

* cited by examiner

Primary Examiner—Richard Hjerpe
Assistant Examiner—Duc Q. Dinh
(74) Attorney, Agent, or Firm—Marian Underweiser

(57) ABSTRACT

In transferring n data bits by the n data lines of an LCD, the n data lines are divided into s blocks each with m data bits (n=m×s). A majority decision is performed on the s blocks and is again performed on the s outputs from the s blocks. With this, a very small-scale and high-speed decision circuit can be realized. As a result, the effects of a reduction in unnecessary radiation by a reduction in the number of data-bit changes, a reduction in power dissipation by a reduction in the number of data-bit changes and the like are obtainable at realizable cost.

12 Claims, 8 Drawing Sheets

DATA-TRANSFERRING METHOD AND APPARATUS FOR REDUCING THE NUMBER OF DATA-BIT CHANGES

BACKGROUND OF THE INVENTION

1. Field of the Invention

The present invention relates generally to the process of transferring data in parallel with a plurality of data lines utilized in the interior of a computer or its associated equipment. More particularly, the invention relates to inverting data in accordance with an efficient majority decision in order to reduce the number of data-bit changes (the number of data transitions) in the case transferring signals in parallel through a plurality of data lines (buses, etc.).

2. Description of the Related Art

In the interior of a computer or its associated equipment, data transfer is performed in an extremely wide range and generally data signals are transferred and processed in parallel through a great number of data lines from the necessity of processing data in large quantities and at high speed. More specifically, when n data bits (where n is a natural number) are transferred, n data lines are prepared and n (n-system) data bits changing in a time series manner are transferred in parallel from a transmitter to a receiver through the n data lines.

The data bits changing in a time series manner make a transition between a logic 0 and a logic 1. Note that the discrimination between a logic 0 and a logic 1 is performing by treating a voltage less than a predetermined voltage as a logic 0 and a voltage greater than the predetermined voltage as a logic 1.

A set of data lines, which are prepared for transferring a plurality of data bits thus changing in a time series manner, form a data-transferring width in data transfer and is generally called a bus. The bus, as hardware, includes all signal-transferring media and wires that can transfer signals in a broad sense. In a narrow sense, the bus, as a set of wires, can also be grasped as a separable component (there are cases where it includes a connector, etc.) called an interface cable or the like.

It is well known that unnecessary radiation of electromagnetic waves will arise when data is transferred. Therefore, attention has been paid to a possibility that unnecessary radiation will be an obstacle to other constituent elements in the interior of electronic equipment and an obstacle to peripheral electronic equipment. As a basic countermeasure on a hardware side for preventing unnecessary radiation such as this, there is an elaborate measure of individually setting a filter to each data line.

A measure such as this is collectively called an electromagnetic interference (EMI) countermeasure and is a countermeasure to pass an allowable value (standard value) determined in specific groups and countries or in the world as a product or an entire system.

The reason why a measure is thus aimed primarily at data lines is that it is seen that EMI radiation often becomes a problem in the case where it arises from a bus or an interface cable serving as a set of data lines than in the case where it arises from internal circuitry. The reason, as also described later, is that an interface cable has a property that it serves as an antenna for EMI radiation and increases EMI radiation, as it becomes longer. In most cases, an interface cable or the like is a separable component for connecting apparatuses separated from each other, so the cable requires a certain degree of length so that it can be widely used.

Presently, the high-density of the hardware in a computer and its associated equipment has advanced, so the complexity is rapidly increasing. An increase in the number of data lines is closely related to this EMI radiation. Particularly, in liquid crystal displays (LCDs), a great number of pixels are disposed for the high density in a display, and in order to these pixels individually, a great number of data lines, such as source lines, gate lines and the like, are provided. Therefore, a total of data lines for realizing data transfer becomes extremely enormous.

FIG. 1 illustrates the constitution of an LCD module 10 employing thin film transistors (TFTs) as an example of an LCD. The digital data bus-clock 20 extending from a gate array 11 is elaborately connected to an X-driver (also called a data driver or a source driver) 30 and a Y-driver (also called a gate driver) 40, whereby a TFT on a pixel electrode specified by X and Y can be driven.

The gate array 11 in this example is also called an LCD controller 11 by the fact that it controls the supply of signals to these drivers. The LCD controller and the drivers, as hardware, are realized as internal logic devices internally wired, such as LSI circuits. In color LCDs, pixel electrodes are alternately required individually every three colors: red, green, and blue. For this reason, the number of data lines becomes extremely enormous.

In the case of an LCD module as hardware, there are cases where it includes not only a panel (in which a liquid crystal is interposed between two glass substrates) but also peripheral members such as a back light. Furthermore, there are cases where it includes up to connector terminals that are connected to a system. Therefore, the meaning of the term "LCD module" is not to be limited to the constitution expressed in FIG. 1 but should be interpreted widely.

Incidentally, it is known that there are the following relations (a)–(c) (general properties) between data transfer and EMI radiation.

(a) When digital signals of the same waveform are sent on n interface cables, the EMI radiation becomes n times the case where the digital signal is sent on a single interface cable.

(b) EMI radiation is proportional to the frequency component of a signal and becomes stronger as the repetition of a signal becomes faster. For instance, in the case where a digital signal simply repeats a logic high, a logic low, (1010 as pulse display, H is high, L is low) a logic high, and a logic low, the strongest EMI radiation arises. This is because a change in data bits per unit time (in this example, 4 bits), which is sent in a time series manner, will arise most frequently.

(c) An interface cable serves as an antenna for EMI radiation and therefore increases EMI radiation, as the cable becomes longer. That is, an external portion extending as a cable and the length thereof become a problem.

With these relations (general properties) as a premise, a contrivance for reducing EMI radiation, particularly based on the relation of (b) (general property), can be divided into the following (A)–(G).

(A) Reduce the number of data-bit changes themselves during data transfer.

(B) Invert (or process) all or some of data bits in order to reduce the number of data-bit changes.

(C) Contrive a method of evaluating the number of data-bit changes.

(D) Simplify a method of evaluating the number of data-bit changes.

(E) Reduce unnecessary radiation by a reduction in the number of data-bit changes.

(F) Reduce power dissipation by a reduction in the number of the data-bit changes.

(G) Select a method of utilizing the evaluation result of the number of data-bit changes.

These contrivances of (A)–(G) will be examined one by one.

First, as a conventional technique regarding (A), there is Published Unexamined Patent Application No. 8-79312. This technique processes data bits in a time series manner with respect to specific data bits (in which 1, 0, 1, and 0 are alternately transferred) that are considered as the worst case that will cause unnecessary radiation, thereby reducing the number of data-bit changes. This technique exhibits effect under a specific condition without particularly adding a redundant inverting signal. However, there are cases where the result of data processing will have an adverse effect on a reduction in the number of data-bit changes. Although it is described that the case having an adverse effect can be avoided by addition of a redundant inverting signal, there is no description of how the case having an adverse effect is avoided by addition of a redundant inverting signal.

Here, a conventional technique regarding (B) inverts data bits so that the number of data-bit changes is minimized, and transfers the inverted data bits along with a redundant inverting signal. The effect of a reduction in the number of data-bit changes results in a reduction in unnecessary radiation (E). If a loss of heat is excluded from consideration, the reduction effect will also result in a reduction in power dissipation (F).

Incidentally, the evaluation of the number of data-bit changes is based on a majority decision. That is, n data bits sent in a time series manner are detected and the number of data bits changed is decided by majority. In other words, with respect to the data bits sent in parallel in a time series manner through data lines, whether or not there is a change (i.e., transition) between 0 and 1 is decided in parallel by majority.

The reason why such a majority decision is made is for obtaining the effect of inversion correction when data bits to be decided by majority are all inverted. That is, only when the number of data bits changed exceeds more than half, the entire data bits can be processed advantageously (so that the number of bit changes can be reduced) by inversion correction (i.e., in the case of 0, it is corrected to 1 and in the case of 1, it is corrected to 0). This can be easily understood from the previously described relation (A). If the significance of the inversion effect based on the result of a majority decision is directly described, the case where an advantageous decision is obtained as a result of a majority decision will mean the case where the number of bit changes can be reduced by inversion. Also, the case where an advantageous decision is not obtained as a result of a majority decision will mean the case where the number of bit changes cannot be reduced by inversion.

In the case where the number of data lines to be decided by majority is an even number, there is a possibility that the number of changed bits and the number of unchanged bits will be the same. In such a case, even when inversion is performed or even when inversion is not performed, the effect of inversion correction is the same. Therefore, inversion does not make sense. It may safely be said that this case will be effective when data bits are not inverted than when data bits are inverted.

Here, considering that the number of the data-transferring lines (n lines) of an LCD or the like is considerably increasing in recent years with an increase in the number of colors and an increase in resolution, it is not suitable to decide all of n data bits by a strict majority. The reason for this is that the data-transferring rate is generally required to be very fast. Also, in order for the entire flow not to be limited by the time required for the strict majority decision, n data bits have be decided within a very short time by the strict majority.

If the number of data lines is not great but small, then the number of data-bit changes will not become great as a whole. Therefore, there is a low possibility that unnecessary radiation will have to be suppressed by specially processing data.

However, as will be easily appreciated from the aforementioned relation (general property) (a), unnecessary radiation is increased (getting worse) in proportion to an increase in the number of n data lines. As a result, the situation becomes significant. Later, in order to make a majority decision in a short time, the decision circuit itself requires connections of a combination of n lines and will become huge, considering the number of lines mutually connected. As a result, it becomes difficult to make the decision circuit as a realistic circuit. To make matters worse, a huge decision circuit itself increases unnecessary radiation or power dissipation. Furthermore, there is a fear that an increase in the scale of circuitry will increase cost.

SUMMARY OF THE INVENTION

The present invention, as a solution for reducing EMI radiation, relates primarily to inverting data bits and thereby reducing the number of data-bit changes, as in the aforementioned (B). The objective of the present invention is to provide novel techniques with regard to a method of deciding the number of data-bit changes and a utilization method thereof, without making a majority circuit complicate.

First, in the present invention, in order to avoid a considerable increase in the size of a majority circuit, the data lines are specified as blocks. A redundant inverting signal is obtained from the result of the majority decision of data bit transitions and is utilized as inversion information. This inversion information indicates whether or not transferred data bits have actually been processed (inverted), i.e., whether or not data bits should be reproduced. The inversion information can be transferred and utilized through an additional data line.

Also, in the present invention, n data lines (n data bits) are divided into s blocks each having m data bits (where n=m×s and where m and s are natural numbers). A majority decision is performed on the s blocks and is again performed on the s outputs from the s blocks. In this manner, the majority circuit can be structurally simplified (D). Also, a very small-scale and high-speed decision circuit can be realized. As a result, the aforementioned effects (E) or (F) are obtainable at an actually realizable cost.

In addition, the result of a majority decision at a small block can be utilized in data inversion with respect to the data transfer in units of m data bits in the interior of an LCD controller, etc. That is, a preselection result as a small block can be used in an internal portion and a main selection result as n data bits can be used in an external portion.

DETAILED DESCRIPTION OF PREFERRED EMBODIMENTS OF THE INVENTION

An embodiment of the present invention will be described with reference to the data leading from the LCD controller in the interior of an LCD display to the source driver, i.e., image data, which will particularly become a problem because of a large number of data lines.

Figure 2:
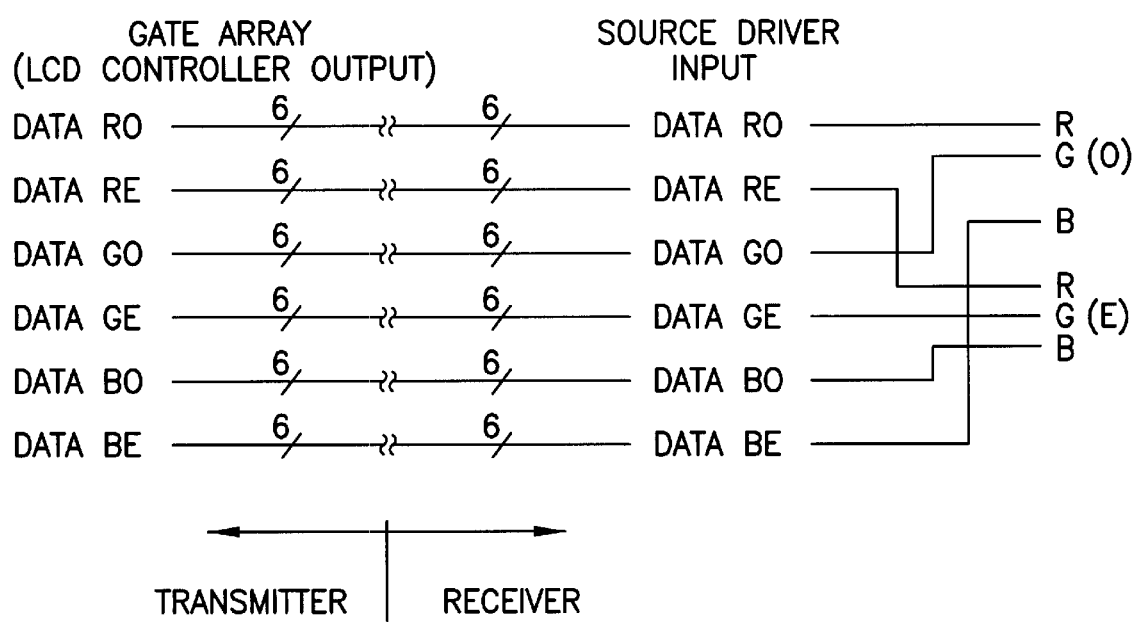
FIG. 2 is a data diagram used for explaining data transfer in the present invention, both an even number and an odd number being prepared and a data-transferring width being doubled in order to transfer the data between the LCD controller and the source drive in the interior of an LCD display.

FIG. 2 illustrates the minimum repetitive unit of data prepared for being input from outputs of a gate array 11 (or an LCD controller) to an X-driver 30 (data driver or source driver) through digital data buses.

Figure 1:
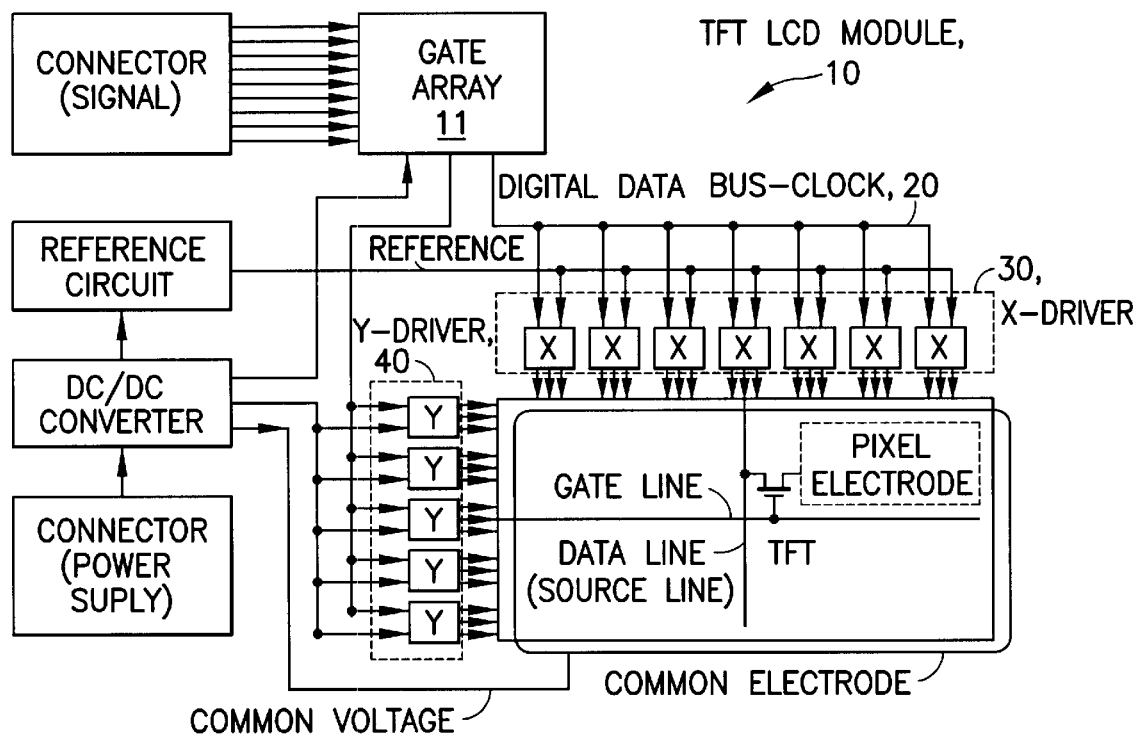
FIG. 1 is a diagram showing the constitution of a thin film transistor (TFT) module 10 as an example of an LCD in which the present invention can be implemented.

Referring again to FIG. 1, signals are transferred onto data lines from the gate array 10 to the X-driver (also called a data driver or a source driver) 30 and the Y-driver (also called a gate driver) 40 through the digital data bus-clock 20. For this reason, the portion of the digital data bus-clock 20, which are provided over a relatively long distance, becomes a problem.

In order to discriminate a portion having such a problem and a portion having no such a problem from each other, an "internal" portion is intended to mean the internal circuitry of the gate array (or LCD controller) 10. An "external" portion means a portion extending from the digital data bus-clock 20. This definition is based on the aforementioned relation (general property) (c). The "external" portion further includes the X-driver (also called a data driver or a source driver) 30 and the Y-driver (also called a gate driver) 40. However, even if they were "external" portions, in these portions the reproduction of data is realized by an internal logic unit.

According to such a definition, a transmitter corresponds to approximately the aforementioned internal portion across the data lines and a receiver corresponds to approximately the aforementioned external portion as a whole. For the EMI problem in the present invention, a portion in which a data signal is outside a transmitter, more specifically, a portion in which a data signal is sent out from a transmitter and received interiorly of a receiver is grasped as an important portion.

In color LCDs, each of the signals corresponding to three primary colors RGB has n data bits in accordance with the depth ($2^n$) of the gradation (brightness level), and furthermore, in some cases the data-transferring width is doubled from the relation with the data-transferring rate in order to correspond to high-resolution. Even in FIG. 2, both an even number and an odd number are prepared to double the data-transferring width. In this case, for the data-transferring width, if the depth of the gradation is assumed to be 6 bits (64 gradations=$2^6$), the total of the data lines will go to 36 (=3×6×2). In the following circuit, a description will be made on the supposition that data bits are sent out in units of n data lines. Note in FIG. 2 that reference numeral 6 represents 6 data lines. The same may be said of the following methods of expression.

As previously described, in the case where data bits are sent so that the data bits on these all data lines change at the same time, the maximum unnecessary radiation will arise. In order to clearly recognize the distinction between the case where an advantageous decision is obtained with respect to the number of data bit transitions and the case where an advantageous decision is not obtained, a "redundant inverting signal" is added, and furthermore, the "polarity" of data bits is defined.

Furthermore, when the redundant inverting signal is a "false," it means that data bits have not been processed and is expressed with a 0. When the redundant inverting signal is a "true," it means that all data bits have been inverted and is expressed with a 1. Since a single data line for transferring the redundant inverting signal is added, the data transferring system is constituted by 37 (36+1) data lines.

The aforementioned definition is based on positive logic. If it is based on negative logic, a true will be expressed with a 0 and a false will be expressed with a 1. The definition of the polarity of data and the adoption of positive or negative logic are selective matters to those having skill in this field. They can be easily modified within the scope of the present invention. Therefore, the present invention is not to be limited by a difference in the definition.

With this fact as a premise, for convenience, the "case where an advantageous decision is obtained by the majority decision" is defined as meaning that when "the polarity" of data is based on positive logic, a redundant inverting signal is treated as a true, also all data bits are inverted, and data bits have been processed.

On the other hand, the "case where an advantageous decision is not obtained by the majority decision" is defined as meaning that when "the polarity" of data is based on positive logic, a redundant inverting signal is treated as a false, also any data bit is not inverted, and data bits have not been processed.

The flow of the entire operation will be described. The transmitter (LCD controller) compares the transferred data bits from the 36 data lines with the previous data bits and obtains data representing bit changes. With this, data-bit changes (data-bit transitions) are detected.

Next, with respect to the number of bit changes, a majority decision is performed on the data width to be transferred in parallel. When data bits having more than 18 bit changes (strictly 19 or more) must be sent out, the data bits are all inverted and a redundant inverting signal is made a true. They are sent out at the same time. When data bits having less than 19 bit changes (strictly 18 or less) must be sent out, the data bits are not inverted and a redundant inverting signal is made a false. They are likewise sent out at the same time. With operation of these bits, even in the worst case, a maximum of 36 bit changes can be reduced to 18 bit changes. The receiver (source driver) performs the exclusive-OR operation between the redundant inverting signal and each data bit, thereby being able to know the fact that data bits have been transferred in an inverted state. The original data can be reproduced from the inverted state.

Figure 3:
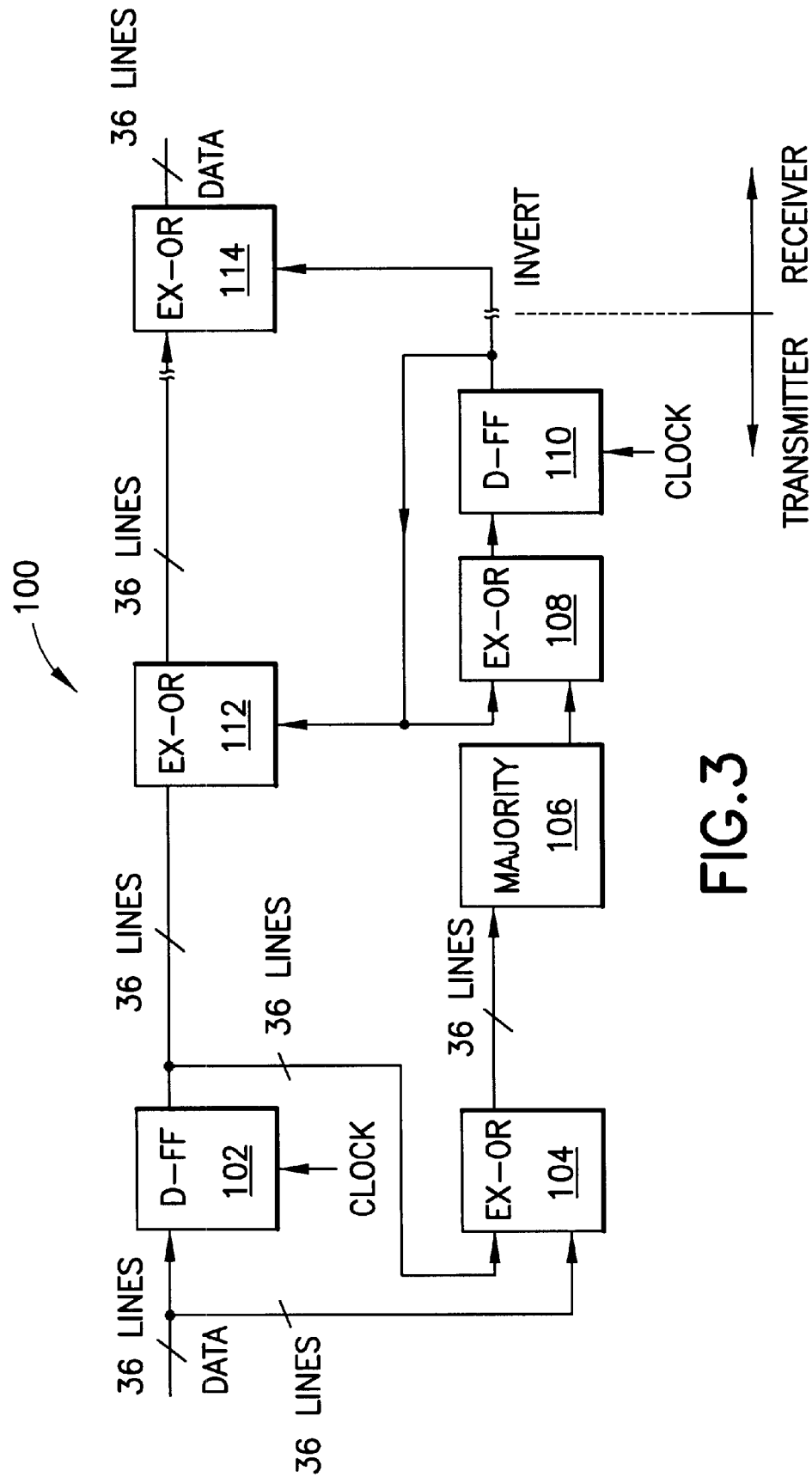
FIG. 3 is a circuit diagram for realizing the measurement of data changes (number of data transitions), a majority decision, transfer, transfer of a redundant inverting signal, and reproduction at both a data transmitter and a data receiver in accordance with an embodiment of the present invention.

A circuit constitution example 100 for realizing such an operation is shown in FIG. 3. This example 100, as hardware, is used as the internal circuitry of a gate array (or LCD controller) 10 that is a transmitter, and the example 100 is realized by internal logic units such as LSI circuits. A clock signal for operational control timing is given by another system via a data line within the digital data bus-clock 20 of FIG. 1. First, 36 input data bits are latched at a D-FF circuit 102. Then, at an exclusive-OR circuit 104, the latched 36 data bits are compared with the 36 data bits one before the latched data bits, and at a majority circuit 106, a majority decision is performed on the 36 data bits. The exclusive OR between the result of decision and the previous redundant inverting signal is performed at an exclusive-OR circuit 108. At a D-FF circuit 110, the resultant data bits are matched with the timing of the 36 data bits from the D-FF circuit 102, and the exclusive OR therebetween is performed at an exclusive-OR circuit 112. With this, data inversion is performed according to the redundant inverting signal. The exclusive OR between the processed (inverted) data bits and the data bits from the D-FF circuit 110 is performed at an exclusive-OR circuit 114, whereby the original data bits can be reproduced.

In the majority circuit 106 of FIG. 3, there is a need to decide a bit change in 36 data bits at high speed by majority.

Figure 4:
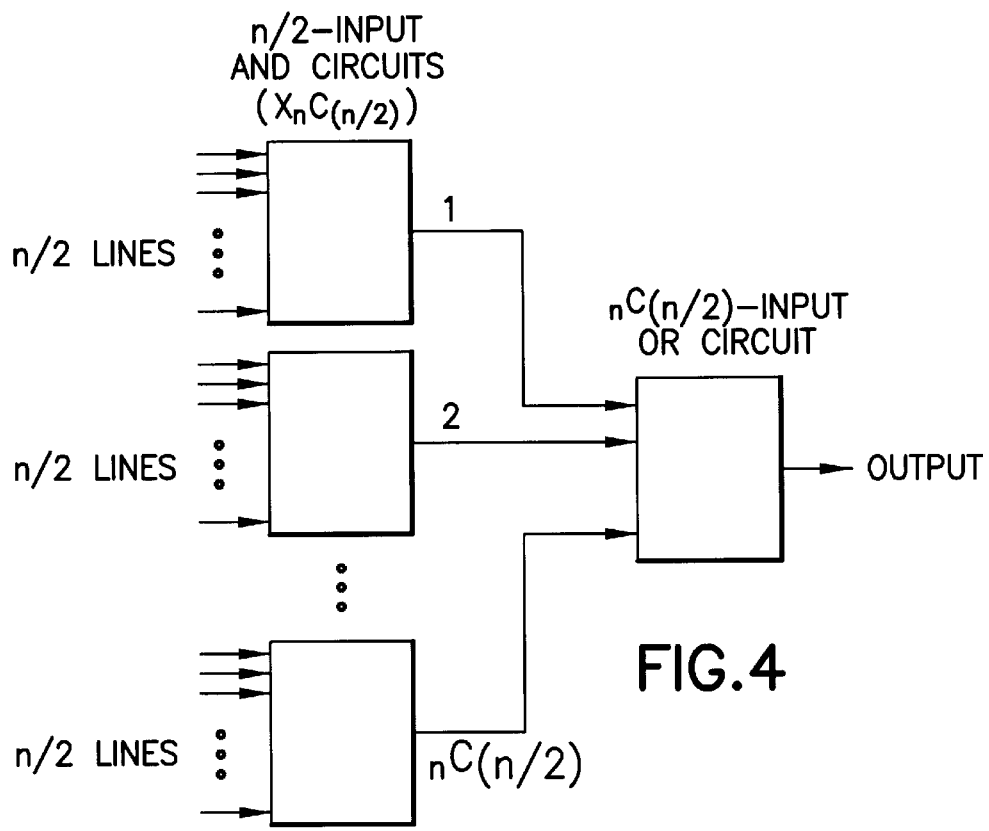
FIG. 4 is a schematic diagram showing a combinational circuit of $_{36}C_{18}$ (about $4.7\times10^8$) configured according to background art.

In the background art illustrated in FIG. 4, a combinational circuit of $_{36}C_{18}$ (about $4.7 \times 10^8$) must be constructed. Generally speaking, half of all data lines (n lines) are input to each AND circuit and the outputs from the $_nC_{n/2}$ gates are input to an OR circuit, whereby an output is obtained.

Figure 6:
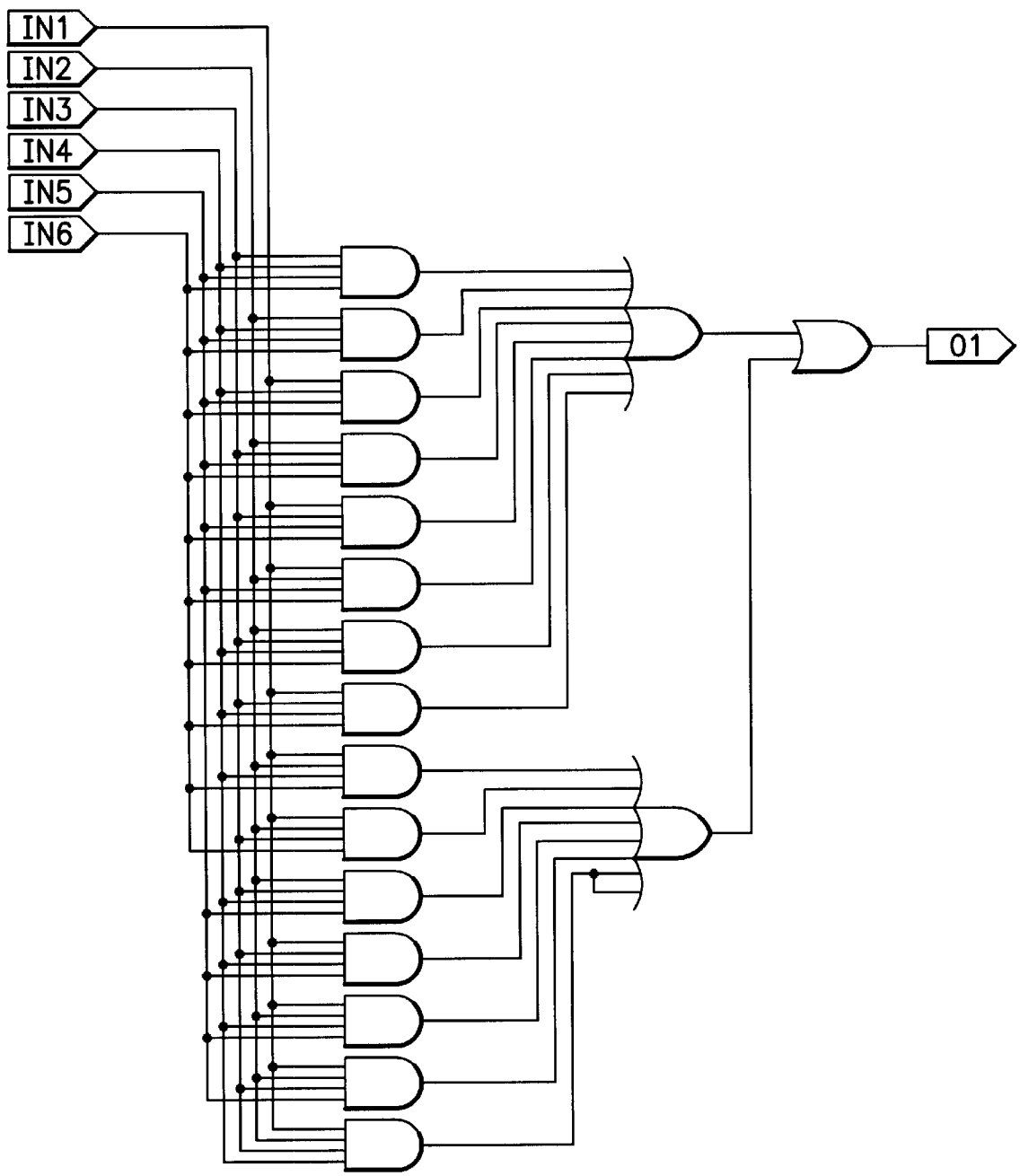
FIG. 6 is a circuit diagram showing the constitution of a conventional 6-input majority circuit.
Figure 7:
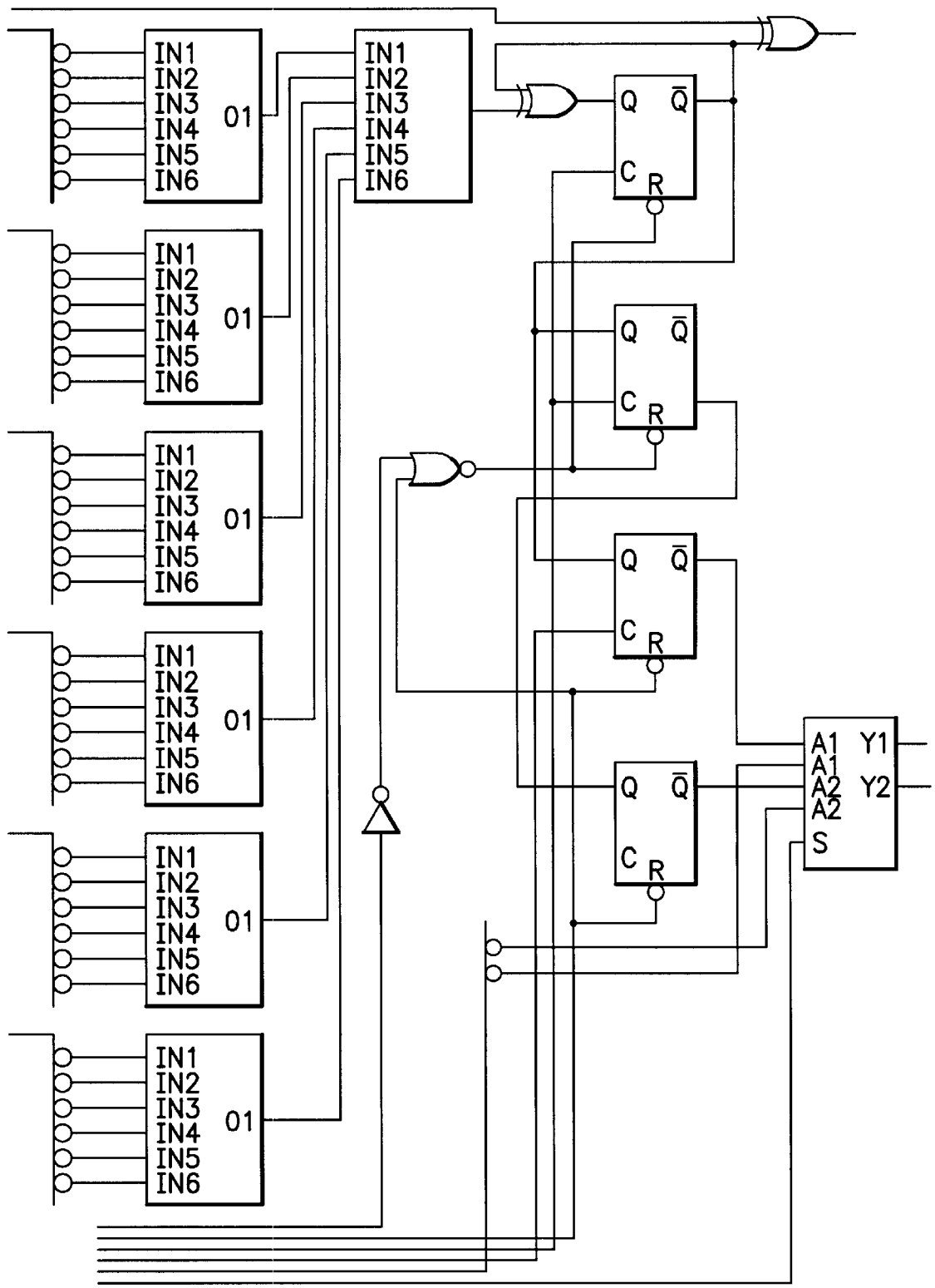
FIG. 7 is a circuit diagram showing the constitution of a conventional 36-input majority circuit employing the 6-input majority circuit.

However, if the aforementioned circuitry is actually constructed, it will become very large and therefore its realization will be difficult as a matter of fact. FIGS. 6 and 7 illustrate conventional 6-input majority circuits. From the complexity of mutual connected lines in these figures, it can be understood that even in the case of a small number such as 6, the number of wires is considerably increased.

Hence, in the present invention, the majority circuit 106 of FIG. 3 is first considered as a realizable method. Then, n data bits are divided into s blocks (n=m×s) each with m lines instead of deciding n lines at a time by majority. Next, a majority decision is performed on each of the s blocks. For the s outputs from the s blocks, a majority decision is again performed. With this, a majority decision can be performed at high efficiency and high speed.

Figure 5:
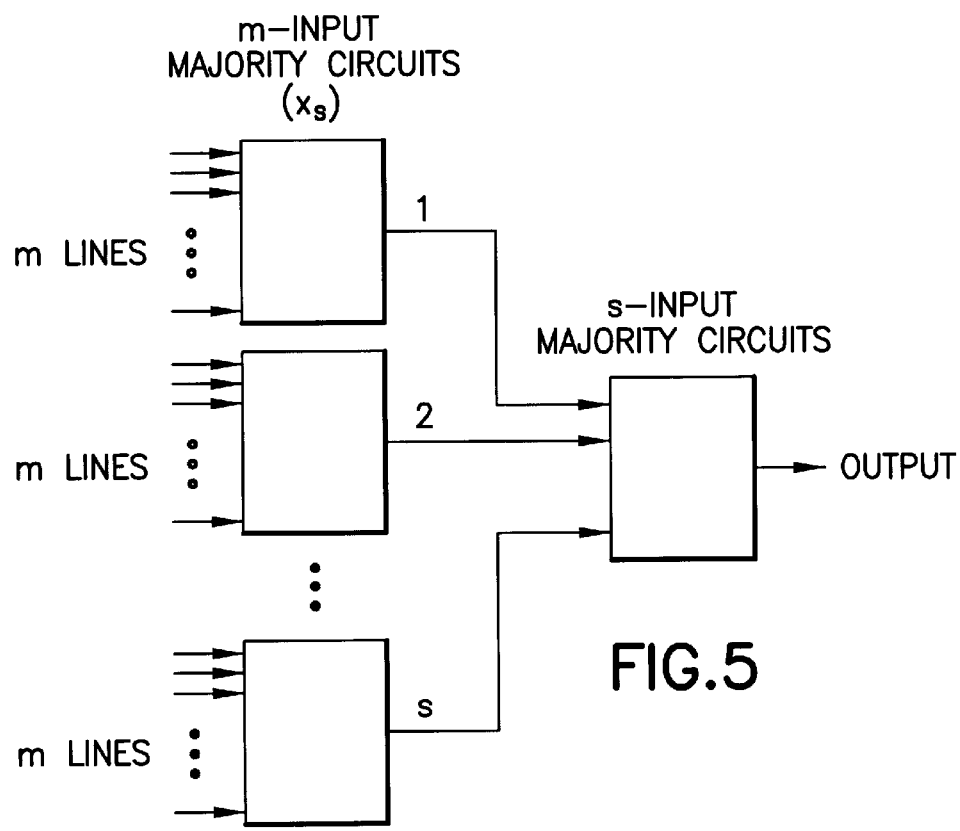
FIG. 5 is a schematic diagram showing the circuit of an embodiment of the present invention in the case where n data lines are divided into s blocks each with m data lines less than n instead of deciding the n data lines at a time by majority and also a majority decision is again performed on the s outputs form the s blocks obtained by a majority decision.

A concrete circuitry with n=36, m=6, and s=6 is given as an example (FIG. 5). First, the number of bit changes (number of transitions) in 6 data bits of each block is decided by majority. In this example, if 4 or more data bits of 6 data bits change, it is assumed that more than half of 6 data bits in this block is inverted. A majority decision is again performed on the 6 outputs from the 6 blocks. In the same manner, if 4 or more outputs of the 6 outputs have been inverted, it is decided that all of the 36 data bits should be inverted.

In the worst case of the aforementioned majority decision, when it is decided by the first majority that 27 data bits of the 36 data bits change (e.g., 6-6-6-3-3-3 in the 6 blocks), it is not decided that all data bits should be inverted. In other words, there are cases where if efficiency is regarded as important, an accurate majority decision will not be performed. In the decision simplifying method of the present invention, the worst case indicates that the reducing effect, which reduces the maximum number of data bit changes obtained by the method of deciding 36 data bits at the same time by majority to half, is obtained up to 75%. This situation, however, is strictly the worst case, even if it is possible. Since the number of data bit changes can be reliably reduced with a realizable circuit, a disadvantage of this degree is considered negligible. For reference, if the number of gates in this case is actually estimated, 60 gates will be required per 6-input majority circuit and 420 gates will be required in total, so the decision simplifying method of the present invention is sufficiently realizable.

Figure 8:
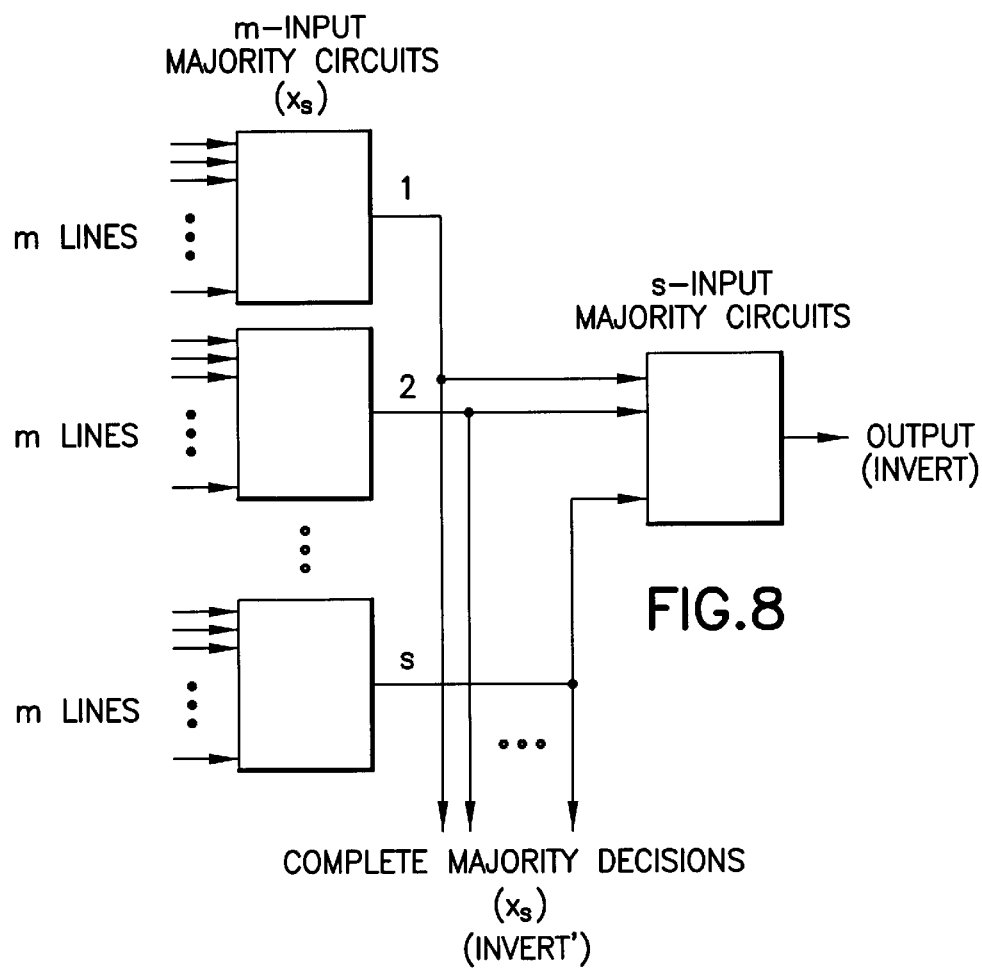
FIG. 8 is a schematic diagram showing the constitution of a circuit for having another look at the result of a majority decision by utilizing s redundant converting signals obtained from s blocks.

In addition, as shown in FIG. 8, since s majority results (preselection results) are accurately obtained for each block specified every m data bits, s redundant inverting signals (indicated as invert') are added to utilize the s majority results. For instance, if the majority results are utilized only in the internal data lines of an LCD controller which are not disposed close to each other, the number of data bit changes can be completely reduced to half by signal inversion. The data blocking and the acquisition of the above-mentioned inverting signals (indicated as invert') from the individual blocks are organically connected together, so that efficient processing becomes possible.

In other words, the above-mentioned fact means that in the majority process of the second stage, the accurate results (preselection results) in the majority process of the first stage which are discarded to obtain the final results can be reused at the interior in order to check data bits before they are transferred outside.

For instance, among the complicatedly connected lines seen in FIGS. 6 and 7, if the accurate preselection results are utilized only in the lines of the LCD controller which are not disposed close to each other, the number of data bit changes will be able to be reduced completely to half by signal inversion. In general, the limitations on internal lines is reduced compared with the limitations on the data lines for transferring data bits outside, so it may safely be said that it is sufficiently effective to utilize this method before data bits are transferred.

Figure 9:
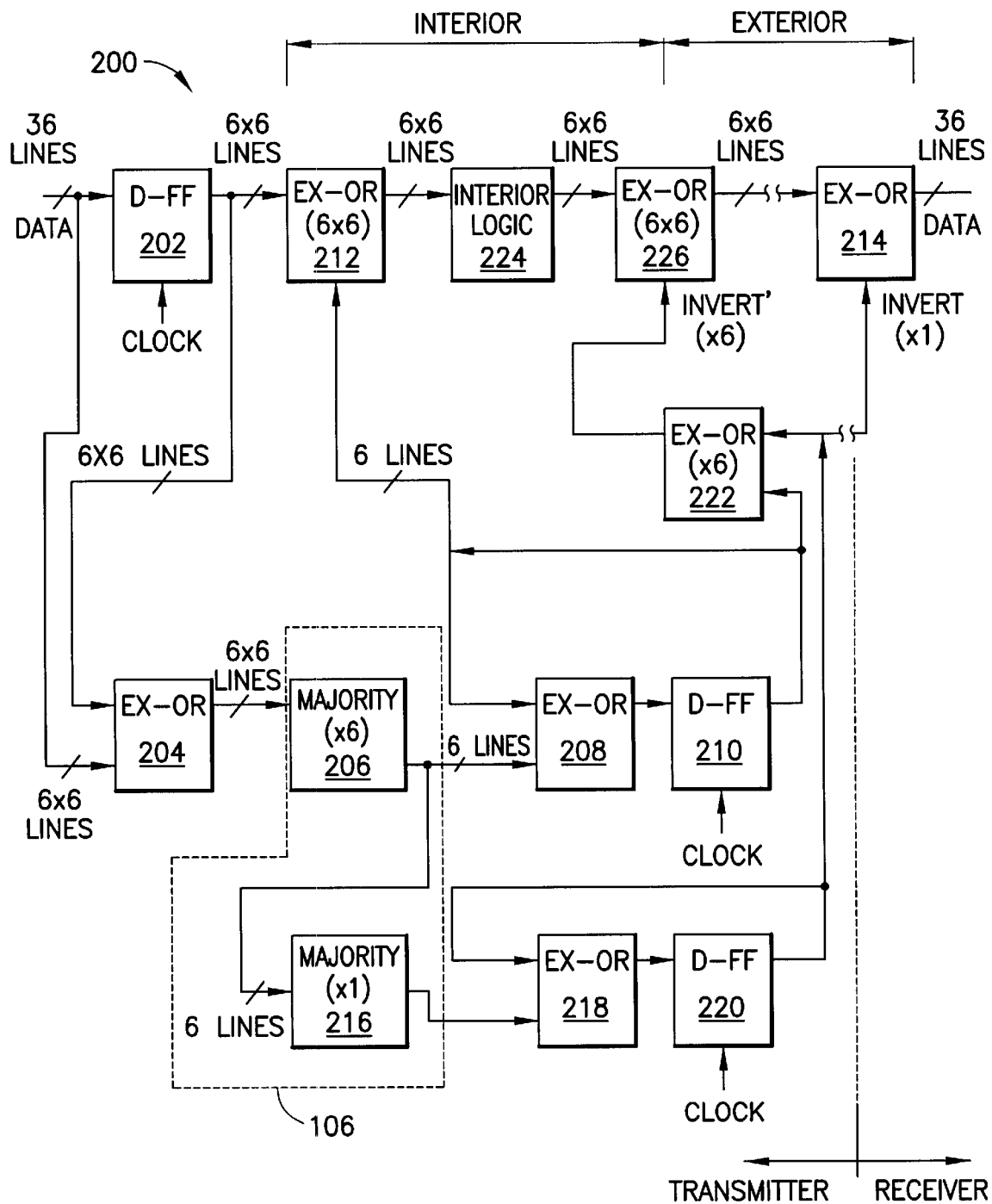
FIG. 9 is a circuit diagram for realizing the measurement of data changes (number of data transitions), a majority decision, transfer, transfer of a redundant inverting signal, and reproduction at both a data transmitter and a data receiver by utilizing s redundant converting signals obtained from s blocks in accordance with an embodiment of the present invention.

FIG. 9 illustrates circuitry 200 that realizes the aforementioned operation. The parts similar to FIG. 2 will first be described. First, 36 input data bits are latched at a D-FF) circuit 202. Then, at an exclusive-OR circuit 204, the latched 36 data bits are compared with the 36 data bits one before the latched data bits, and at a majority circuit 206, a majority decision is performed on the 36 data bits. The exclusive OR between the result of decision and the previous redundant inverting signal is performed at an exclusive-OR circuit 208.

At a D-FF circuit 210, the resultant data bits are matched with the timing of the 36 data bits from the D-FF circuit 202, and the exclusive OR therebetween is performed at an exclusive-OR circuit 212. With this, data inversion is performed according to the redundant inverting signal. The exclusive OR between the processed (inverted) data bits and the data bits from the D-FF circuit 210 is performed at an exclusive-OR circuit 214, whereby the original data bits can be reproduced.

In FIG. 9, at the majority circuit 206 a majority decision is performed to obtain a correct majority result. With this result, the inversion of the data bits in an internal logic circuit 224 is performed at an exclusive-OR circuit 212 and an exclusive-OR circuit 226. In addition, with the majority result from the same majority circuit 206, a majority decision is performed at a majority circuit 226. That is, the portion equivalent to the majority circuit 106 in FIG. 3 is equivalent to a combination of the majority circuits 206 and 216 in FIG. 9 (circumscribed by a broken line). This can be easily understood from the comparison of FIG. 3 and FIG. 9.

The inversion of external data bits is performed at the exclusive-OR circuits 226 and 214. In the exclusive-OR circuit 226, internal and external inversion results can be shared by performing an exclusive-OR operation.

Figures 10A, 10B:
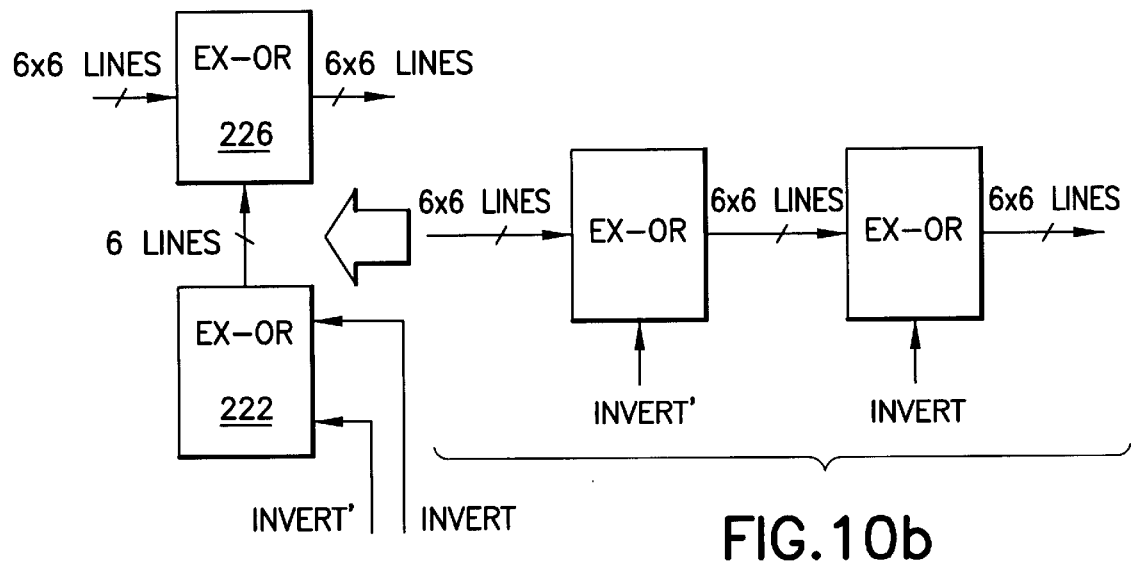
FIG. 10(a) is a diagram showing that a signal exclusive-OR circuit can be omitted.
FIG. 10(b) is a diagram showing that there is a need to dispose two successive exclusive-OR circuits and repeat inversion.

Referring to FIG. 10, the meaning of the sharing between internal and external portions can be readily understood. As shown in FIG. 10(b), there is originally a need to dispose two successive exclusive-OR circuits at the position of the exclusive-OR circuit 226 and repeat inversion. As shown in FIG. 10A, a single exclusive-OR circuit can be omitted, so there is no need to perform extra logic processing and there is an advantage that data transfer can be performed at high speed by the amount corresponding to this omission. The logic circuits of FIG. 10(a) have been taken out on an enlarged scale from FIG. 9.

Utilizing the present invention, data reduction by preselection results can be efficiently performed, by considering the feature of data bits to be handled when the data bits are divided into blocks. For instance, where data bits to be handled consist of red (R), green (G), and blue (B) data bits, there is a feature that signals are often inverted at a time every these three data bits. With this feature, it is conceivable that data bits are divided into blocks representing RGB bits.

The present invention is able to suitably select the rank of data inversion in accordance with the amount of wiring by having both results of an accurate majority decision and a simplified majority decision. As a result, at the internal and external data buses of the LCD controller, an efficient reduction in the number of data bit changes can be performed with an additional circuit that is relatively small in size.

While the embodiment of the present invention has been described with reference to the internal buses of an LCD, the invention is widely applicable to data buses widely used between a personal computer (PC) and a CRT display, data buses in the interior of a device that has a plurality of data lines and also transfers data, such as a CPU, and buses between devices.

Finally, although the present invention has been described by way of the preferred embodiments thereof with reference to the logic circuits of FIGS. 3 and 9, various changes and modifications will be apparent to those having skill in this field. Therefore, unless these changes and modifications otherwise depart from the scope of the present invention, they should be construed as included therein.

What is claimed is:

1. A method of transferring data by utilizing n data lines where n is a natural number, comprising:

a step of specifying at least one block from said n data lines, said certified at least one block including a plurality of data lines less than n;

a first decision step of deciding whether or not there is a transition in a data bit sent for each data line by majority with respect to said plurality of data lines included in said specified at least one block, separately from the remaining data lines not included in said specified at least one block; and a second decision step of further deciding whether or not there is a transition in a sent data bit or a sent result by majority with respect to the result obtained by the majority decision in said first decision step and the remaining data lines not included in said specified at least one block or with respect to the result obtained by the majority decision in said first-decision step and a result obtained by a majority decision of the remaining data lines not included in said specified at least one block;

in each of said first and second decision steps, when an advantageous decision is obtained by the majority decision in the decision step, deciding polarity of data bits to be a true, using the polarity as a result of the decision step, and inverting all data bits that have been decided by the majority decision;

in each of said first and second decision steps, when an advantageous decision is not obtained by the majority decision in the decision step, deciding polarity of data bits to be a false and using the polarity as a result of the decision step, said method further comprising:

a step of transferring information about the polarity of data bits as a first redundant inverting signal by utilizing at least one additional data line prepared separately from said n data lines; and a step of reproducing original data bits from the data bits inverted responsively to the polarity of the data bits being a true, in accordance with the information about the polarity of the data bits which is transferred as the first redundant inverting signal after transfer of the data bits.

2. The method as set forth in claim 1, wherein the step of specifying said at least one block from said n data lines has a step of dividing said n data lines into s blocks each having m data lines (n=m×s).

3. The method as set forth in claim 2, wherein said first decision step further includes a step of individually obtaining a second redundant inverting signal for each block.

4. The method as set forth in claim 3, wherein said second redundant inverting signal individually obtained for each block in said first decision step is utilized as information about data inversion in order to check the result of the majority decision of the data bits before the data bits are transferred.

5. The method as set forth in claim 4, wherein said first redundant inverting signal obtained in said second decision step, in a relation with said second redundant inverting signal, is utilized as information about data inversion in order to check the result of the majority decision of the data bits before the data bits are transferred.

6. The method as set forth in claims 2 through 5, wherein said n data lines are divided into at least three blocks representing red, green and blue colors.

7. An apparatus for transferring data, comprising:

n data lines where n is a natural number, at least one block including a plurality of data lines less than n being specified from said n data lines;

a first decision device adapted to decide whether or not there is a transition in a data bit sent for each data line by majority with respect to said plurality of data lines included in said specified at least one block, separately from the remaining data lines not included in said specified at least one block; and a second decision device adapted to further decide whether or not there is a transition in a sent data bit or a sent result by majority with respect to the result obtained by the majority decision by said first decision device and the remaining data lines not included in said specified at least one block or with respect to the result obtained by the majority decision by said first decision device and a result obtained by a majority decision of the remaining data lines not included in said specified at least one block;

in each of said first and second decision devices, when an advantageous decision is obtained by the majority decision, polarity of data bits being decided to be a true and also being used as a result from the decision device, and all data bits that have been decided by the majority decision being inverted;

in each of said first and second decision devices, polarity of data bits being decided to be a false when an advantageous decision is not obtained by the majority decision in the decision device and also being used as a result from the decision devices, said apparatus further comprising:

at least one additional data line prepared separately from said n data lines so that information about the polarity of data bits can be transferred as a first redundant inverting signal; and a device adapted to reproduce original data bits from the data bits inverted responsively to the polarity of the data bits being a true, in accordance with the information about the polarity of the data bits which is transferred as the first redundant inverting signal after transfer of the data bits.

8. The apparatus as set forth in claim 7, wherein the specification of said at least one block from said n data lines is performed by dividing said n data lines into s blocks each having m data lines (n=m×s).

9. The apparatus as set forth in claim 8, wherein a second redundant inverting signal is further obtained individually for each block.

10. The apparatus as set forth in claim 9, further comprising a device adapted to utilize said second redundant inverting signal, individually obtained for each block in said first decision device, as information about data inversion to check the result of the majority decision of the data bits before the data bits are transferred.

11. The apparatus as set forth in claim 10, further comprising a device adapted to utilize, in a relation with said second redundant inverting signal, said first redundant inverting signal obtained by said second decision device as information about data inversion to check the result of the majority decision of the data bits before the data bits are transferred.

12. A liquid crystal device (LCD) module including the apparatus as set forth in claim 7.

* * * * *